United States Patent [19]

Perkins

[11] Patent Number: 5,657,946
[45] Date of Patent: Aug. 19, 1997

[54] STATIC VENT UNITS

[75] Inventor: Terrence Leydon Perkins, Yeovil, Great Britain

[73] Assignee: Westland Helicopters Limited, Yeovil, England

[21] Appl. No.: 528,156

[22] Filed: Sep. 13, 1995

[30] Foreign Application Priority Data

Sep. 15, 1994 [GB] United Kingdom ............ 9418575

[51] Int. Cl.⁶ ........................................... B64D 43/02
[52] U.S. Cl. ........................... 244/1 R; 244/53 B
[58] Field of Search ..................... 244/1 R, 53 B, 244/209, 208; 138/37, 39, 42; 137/15.1; 114/198, 211; 440/88; 415/914, 182.1

[56] References Cited

U.S. PATENT DOCUMENTS

| | | | |
|---|---|---|---|
| 1,641,670 | 9/1927 | French | 114/198 |
| 2,084,338 | 6/1937 | Hamblin | 114/211 |
| 3,612,439 | 10/1971 | Wingham. | |
| 4,432,694 | 2/1984 | Kuroda et al. | 415/914 |

*Primary Examiner*—Andres Kashnikow
*Assistant Examiner*—Tien Dinh
*Attorney, Agent, or Firm*—Larson & Taylor

[57] ABSTRACT

This invention provides a static vent unit e.g. for use on the side of an aircraft and which in operation is subjected to airflow from any direction within a wide airflow incidence range comprises a generally flat plate having an outer surface for fitment generally to flush to an outer surface of the aircraft, a vent port through the plate for connection during operation to a static vent line in the aircraft, and a bulge on the plate outer surface surrounding at least part of a circumference of the vent port and having in cross section a convex curved upper surface extending radially inwardly from an outer edge on the plate to an inner edger on the plate adjacent the circumference of the vent port and adapted during operation to promote attachment of an airflow from within at least part of the airflow incidence range to its surface and direct the airflow into the vicinity of the vent port to provide a compensating increase in ambient pressure at the vent port.

11 Claims, 3 Drawing Sheets

1

STATIC VENT UNITS

BACKGROUND OF THE INVENTION

This invention is concerned with static vent units and particularly but not exclusively with static vent units for use on rotary wing aircraft such as helicopters.

Static vent units are used on both fixed and rotary wing aircraft to sense the ambient pressure of the air through which the aircraft is flying. This provides an indication of the altitude at which the aircraft is flying and, in combination with a pressure signal sensed by a forward facing pitot tube, an indication of the airspeed and, for fixed wing aircraft, the Mach number.

For this reason, static vent units have ideally to be located in a position where the local ambient pressure varies only with altitude and not with other features such as airspeed and relative wind direction, and are therefore usually located in the sides of an aircraft fuselage.

However, it is extremely difficult to find a suitable location where the local pressure remains unaffected by disturbing factors throughout the entire operating range so that the local ambient pressure is often in error by a significant amount, resulting in inaccurate information to the pilot.

DESCRIPTION OF THE PRIOR ART

U.S. Pat. No. 3,612,439 discloses a static vent unit for a high performance fixed wing aircraft designed to operate over a wide Mach number range extending to supersonic values. The unit includes compensation means in the form of an exterior shallow bulge having a thickness which decreases smoothly from a central region to the edges and includes a static vent formed by an aperture located in the surface of the bulge itself and offset in respect of a major axis of the vent unit.

The prior device operates to modify the airflow locally in operation so as to compensate a position error arising from variation in Mach number, and in respect of airflow from one generally uniform direction.

The problems concerned with location and operation of static vent units on a rotary wing aircraft, particularly a helicopter, are exacerbated both because of the downwash created by the main sustaining rotor and the wide range of operating conditions of which the helicopter is capable. This means that the direction of relative airflow changes significantly with changes in operating conditions and can in some circumstances be completely reversed resulting in a very wide airflow incidence angle in which the static vent unit is required to operate.

An objective of this invention therefore is to provide a static vent unit with improved accuracy throughout a wide airflow incidence range.

SUMMARY OF THE INVENTION

According in one aspect this invention provides a static vent unit for use on a vehicle and which in operation is subjected to airflow from any direction within a wide airflow incidence range, comprises a generally planar mounting member for fitment generally flush to an outer surface part of the vehicle, a vent port through the member for connection during operation to a static vent line in the vehicle, and a bulge extending outwardly from the member and surrounding at least part of the vent port, the bulge having in cross section, a convex curved upper surface extending radially inwardly from an outer edge on the member to an inner edge on the member adjacent the vent port and the bulge being adapted during operation to promote attachment of an airflow from within at least part of the airflow incidence range to its surface and direct the airflow into the vicinity of the vent port to provide a compensating increase in ambient pressure at the vent port.

According to a second aspect of the invention we provide a vehicle having a static vent unit according to the first aspect of the invention.

BRIEF DESCRIPTION OF THE DRAWINGS

The invention will now be described by way of example only and with reference to the accompanying drawings in which.

DESCRIPTION OF THE PREFERRED EMBODIMENTS

In the design of a new helicopter a desired location for a static vent unit on the side of the fuselage was determined. Wind tunnel tests to indicate the ambient pressure characteristics at the desired location were conducted through a wide range of airflow incidence angles expected to be encountered during operation of the helicopter.

Figure 1:
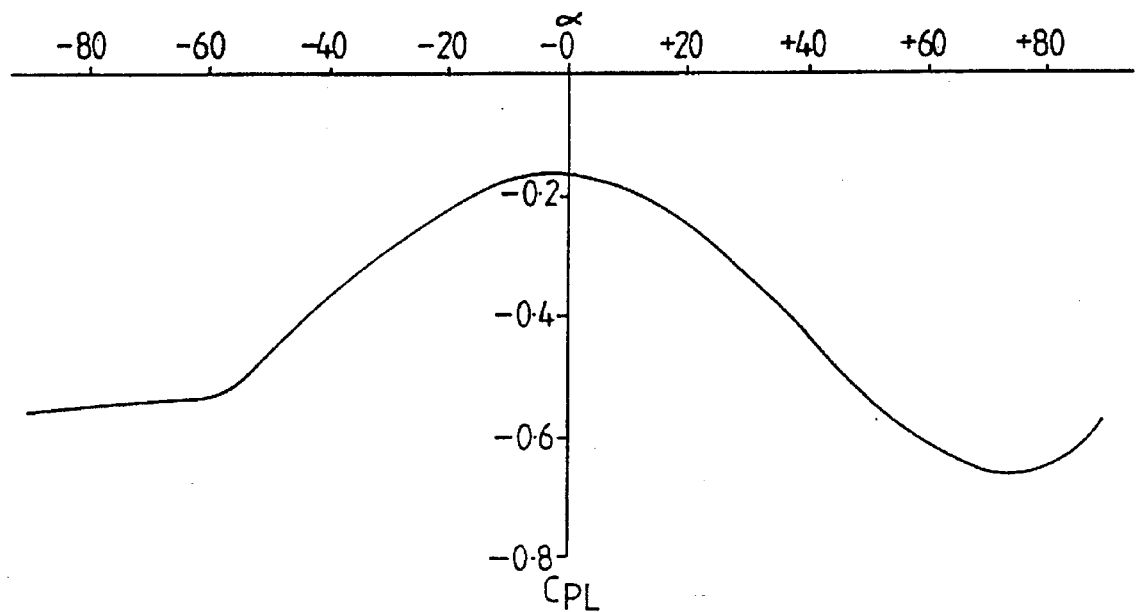
FIG. 1 is a graph plotting airflow incidence ($\alpha$) against a pressure coefficient ($C_{PL}$) at an intended location for a static vent unit on the side of a helicopter.

The results are shown in FIG. 1 which plots a local pressure coefficient ($C_{PL}$) against a range of airflow incidence angles ($\alpha$) between −80 degrees and +80 degrees. In explanation, an airflow incidence angle $\alpha$ of 0° relative the static vent unit location is a generally horizontal airflow from the front with negative angles running clockwise therefrom and positive angles running counterclockwise (refer to FIG. 3). As will be clear from FIG. 1, the tests showed that the intended location was in a low pressure (i.e. below ambient pressure) area throughout the entire airflow incidence range as indicated by $C_{PL}$ which varies from about −0.18 at zero incidence to about −0.54 at −80 degrees and −0.66 at +80 degrees.

This situation was entirely unsatisfactory since a static vent unit sited at the desired location would cearly register an under pressure throughout the entire airflow incidence range which would result in inaccurate information being provided to the pilot from the various instruments requiring a sensed static pressure. Such inaccuracies could severely endanger the safety of the aircraft and its occupants.

In order to consider ways of overcoming this problem the inventor decided to calculate the compensation required from a static vent unit to provide a resultant pressure coefficient ($C_{PR}$)=0 throughout the airflow incidence range. Such a compensation, if achievable, would of course provide an entirely accurate indication of ambient pressure throughout the airflow incidence range.

Thus, starting from, $$C_{PR} = C_{PL} + C_{PD} - [C_{PL} \times C_{PD}] \quad (1)$$

where
$C_{PR}$=Resultant pressure coefficient
$C_{PL}$=Local pressure coefficient
$C_{PD}$=Device pressure coefficient
Substituting $C_{PR}$=0 then, $$C_{PL} \times C_{PD} = C_{PL} + C_{Pd} \quad (2)$$

Which resolves into, $$C_{PD} = \frac{C_{PL}}{C_{PL} - 1} \quad (3)$$

Figure 2:
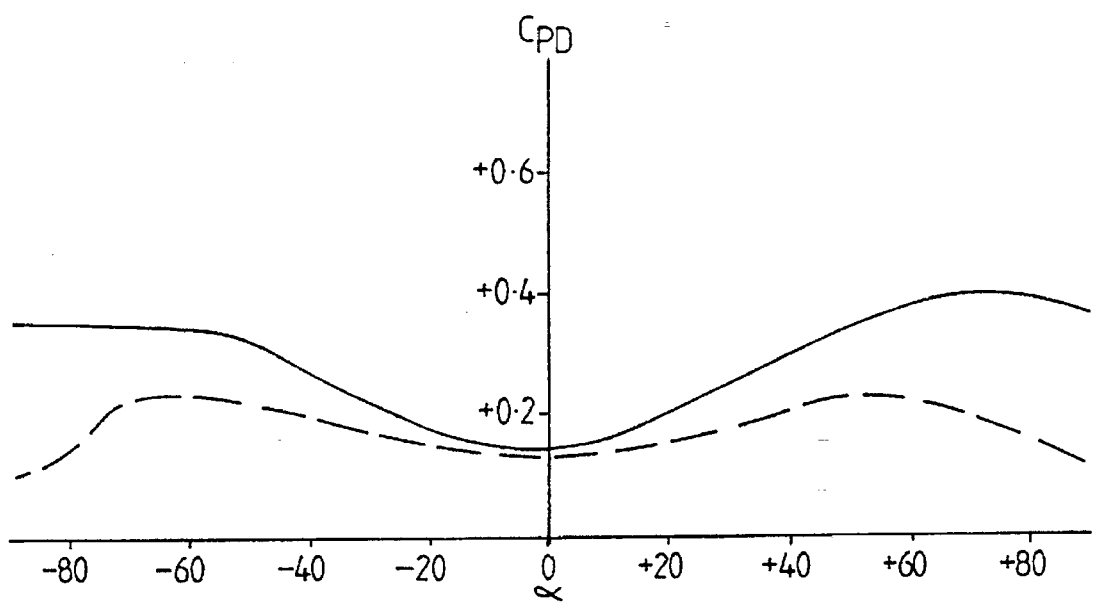
FIG. 2 is a graph plotting airflow incidence ($\alpha$) against a pressure coefficient ($C_{PD}$) showing a calculated required compensation and an actual compensation achieved by a static vent unit according to this invention.

FIG. 2 plots $C_{PD}$ against airflow incidence α and shows in full line the calculated compensation using equation (3) required to make $C_{PR}$=0 throughout the airflow incidence range. The requirement is for a positive $C_{PD}$ ranging from about +0.14 at α=0° to about +0.34 at α=−80° and about +0.4 at α=+80°.

Thus it was clear that a static vent unit to meet this requirement would have to be capable of providing a compensating overpressure for an under pressure throughout the entire airflow incidence range. Clearly the device of U.S. Pat. No. 3,612,439 was incapable of providing such compensation since that unit was designed to compensate overpressure for under pressure with airflow in one direction relative its longitudinal axis and under pressure for overpressure with the airflow in the opposite direction. For this reason also, the inventor decided that the raised location of the month of the aperture in the surface of the bulge of the prior art device was not suitable in a device for solving his problem, and that the mouth of the aperture should preferably be flush with the external surface of the aircraft as in conventional un-compensated static vent units.

The problem faced by the inventor then was how to artificially increase the pressure at the vent aperture by a variable amount throughout a wide airflow incidence range. He decided that what was needed was a combination of a ramp-type device behind the vent aperture to increase the pressure at low airflow incidence angles with some means for guiding the airflow into the area of the vent aperture and by varying amounts at the larger airflow incidence angles at both ends of the operating range.

Eventually he decided to try to obtain such airflow guidance using attached flow characteristics, similar to that used on an upper surface of an aerofoil to create a differential pressure to produce lift, by shaping an area of the upper surface of the static vent unit such as to promote attachment of an airflow from radially outward directions at least towards the ends of the required airflow incidence range, and to guide the attached airflow into the area of the vent aperture.

One embodiment of a novel static vent unit embodying such characteristics will now be described with reference to FIGS. 3, 4 and 5 of the accompanying drawings.

The static vent unit, generally indicated at 11, includes a generally planar mounting member being in this example, flat circular support plate 12 located in a recess 13 in the side 0f a helicopter fuselage 14 so that an outer surface of the support plate 12 is generally flush with an outer surface of the fuselage 14.

A circular static vent port 15 extends through the support plate 12 and connects to a static vent line 16 in the fuselage 14 for transmitting, during operation, a signal representative of ambient pressure to helicopter instrumentation in known manner.

For descriptive purposes it is useful to align the static vent unit 11 as in a typical operational environment and to that end it is to be noted that the vent port 15 is located on a horizontal centreline 17 of the support plate 12 and a little to one side of a vertical centerline 18. In operation, the horizontal centerline 17 is aligned with zero airflow incidence as indicated at 0° in FIG. 3 in respect of airflow approaching in the direction of arrow C. In operation of the helicopter, the airflow incidence varies over a wide range and relative incidence angles up to −80° running clockwise from the 0° incidence and up to +80° running counterclockwise from the 0° incidence are indicated in FIG. 3.

A bulge 19 generally semi-circular in plan is located on the plate 12 downstream of the vent port 15 and is centered parallel to the longitudinal centerline 17 and, therefore, the airflow in the direction of arrow C at 0° airflow incidence angle, so as to surround part of the circumference of the vent port 15. It will be noted that upper and lower curved lobe portions 20 and 21 of the bulge 19 extend forwardly beyond the extremities of both the positive and negative airflow incidence range.

Figure 5:
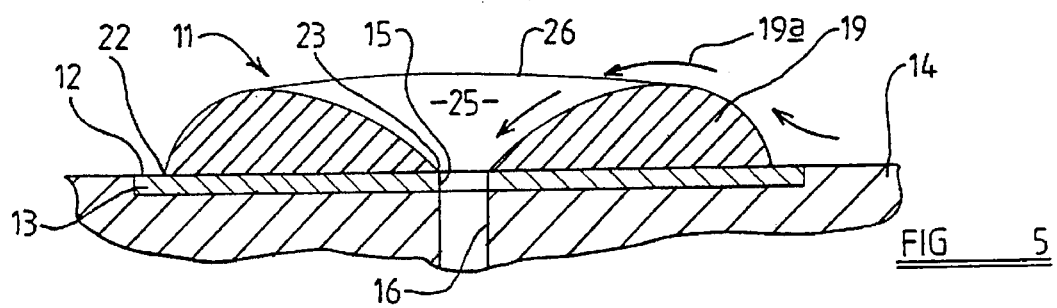
FIG. 5 is a sectioned view taken on lines B—B of FIG. 1.

As indicated best in the sectioned view of FIG. 5 a curved upper surface of the bulge 19 extends radially inwardly from an outer edge 22 on the surface of the plate 12 with an increasing radius of curvature to an inner edge 23 adjacent the circumference of the vent port 15. In this respect it is to be noted that the convex curved surface of the bulge 19 can be compared with an upper surface of an aerofoil in which edge 22 is representative of the leading edge and edge 23 is representative of the trailing edge.

In the illustrated embodiment, the static vent unit 11 includes a dam portion 24 located downstream of the vent port 15. The dam portion 24 includes a forward facing surface 25 extending generally perpendicular to the surface of support plate 12 and perpendicular to the horizontal axis 17. The surface 25 has a sharp upper edge 26 which blends at its ends into the upper surface of the bulge 19, and a rear sloping surface 27 which again blends with the upper surface of bulge 19.

Figure 6:
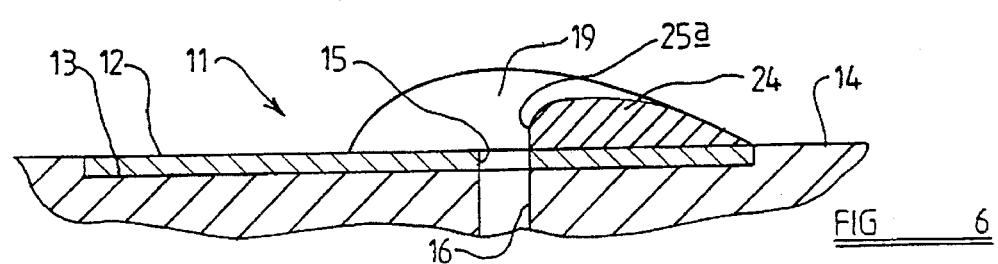
FIG. 6 is a sectioned view similar to FIG. 4 showing a modification of the unit of FIG. 3.

In a modification illustrated in FIG. 6 the vertical surface 25 of dam 24 is replaced by a convex curved portion 25a again blended rearwardly with the curved surface of the bulge 19.

Figure 3:
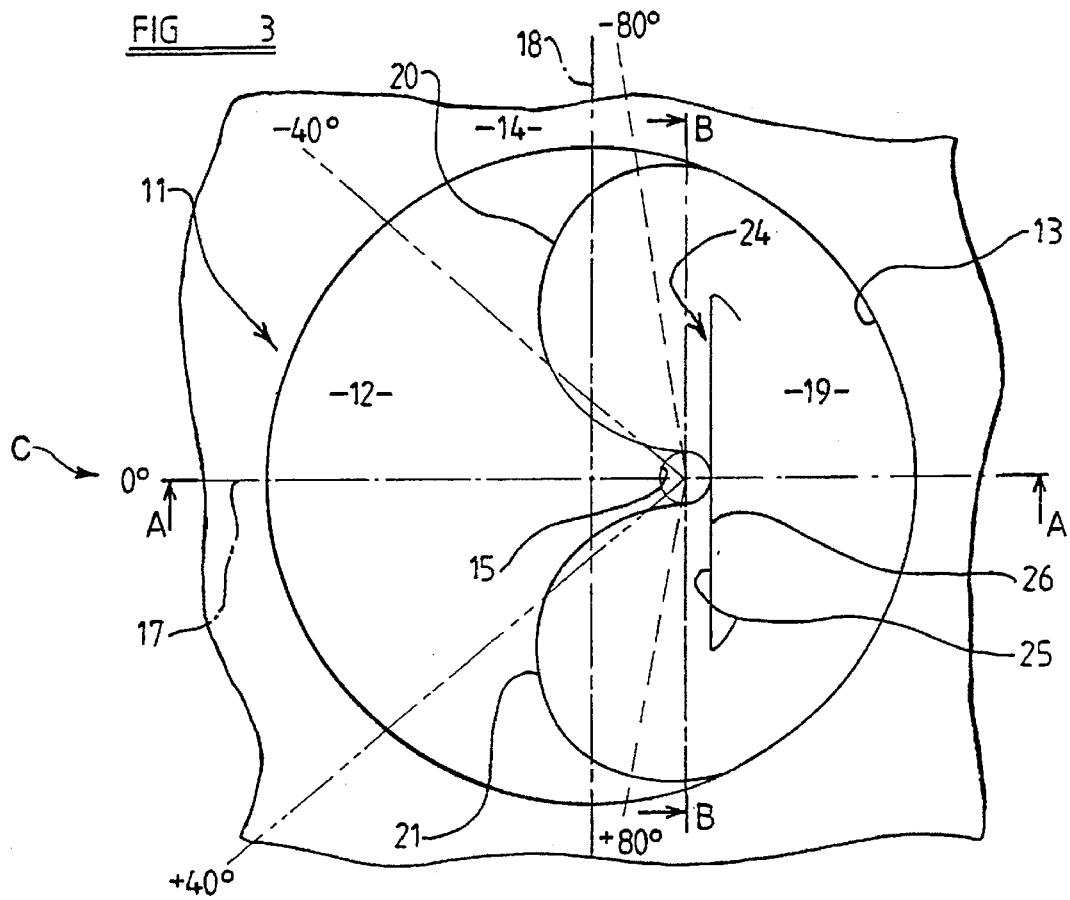
FIG. 3 is a plan view of a static vent unit constructed according to one embodiment of the invention.

In operation of the static vent unit of this invention, airflow approaching at high airflow incidence angles within the indicated airflow incidence range on FIG. 3 (greater than about −30° or +30° in the illustrated embodiment), contacts the surface of the bulge 19 and is encouraged by the convex curved shape to attach to the surface and flow along the increasing radius of curvature into the area of the mouth of the circular vent port 15 as indicated by the flow arrows 19a in FIG. 5, to provide a compensating increase in pressure. At mid-range airflow incidence angles (i.e. between about −30° and +30° in the illustrated embodiment), the desired compensating increase in pressure at the mouth of the vent port 15 is ensured by the airflow contacting the forward facing surface 25 or 25a of the dam portion 24.

Figure 4:
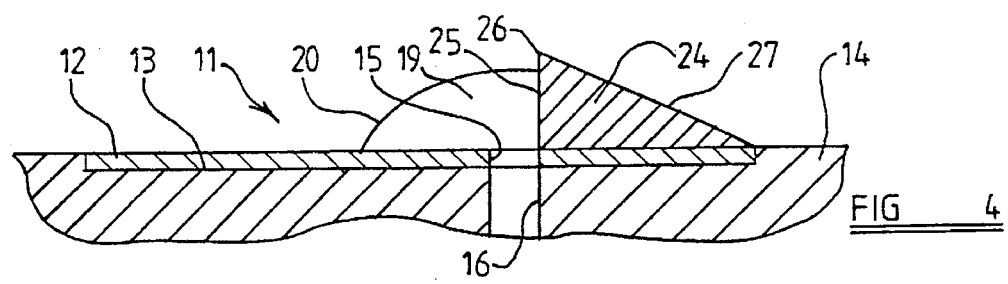
FIG. 4 is a sectioned view taken on lines A—A of FIG. 1.

Reverting now to FIG. 2, the broken line indicates the compensation actually achieved in tests of the static vent unit 11 of FIGS. 3, 4 and 5 and can be compared with the calculated compensation shown in full line required to provide $C_{PR}$=0 throughout the airflow incidence range. It will be seen that at low airflow incidence angles almost all of the required compensation has been achieved. At the larger airflow incidence angles, the achieved compensation with the illustrated embodiment, whilst not sufficient to match the calculated required compensation, nevertheless represents a significant improvement in performance that will greatly enhance the accuracy of the aircraft instrumentation. Furthermore, it is confidently envisaged that further improvements in these areas will be achievable by fine tuning of the curved surface of the bulge 19 at the requisite locations.

Thus, the static vent unit 11 of this invention when located in a low pressure (below ambient) area on the side of a helicopter fuselage operates throughout a wide airflow incidence range to increase a sensed ambient pressure to compensate for the prevailing low pressure.

Figure 7:
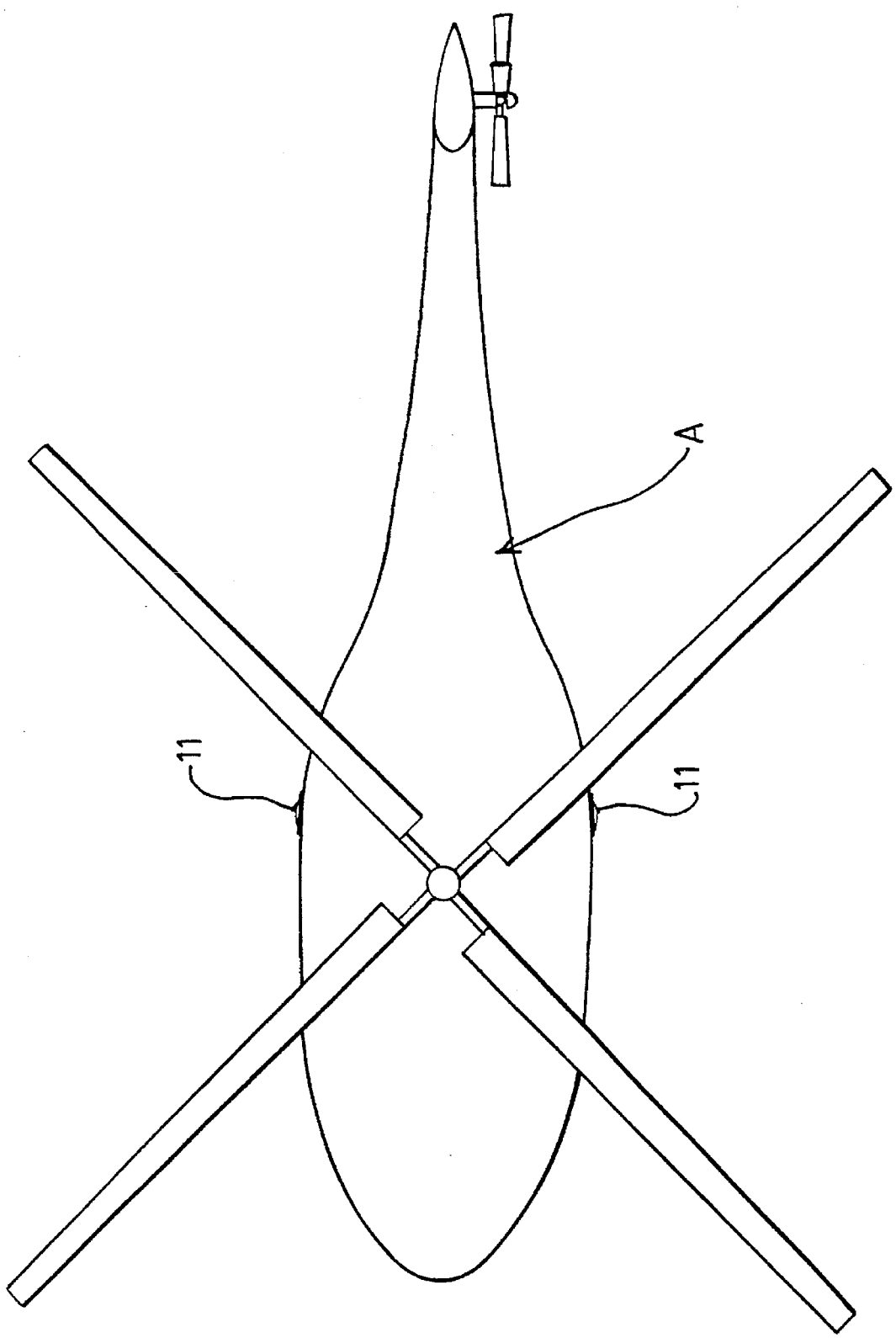
FIG. 7 is an illustrative view of an aircraft embodying the invention.

FIG. 7 illustrates a typical rotary wing aircraft to which the invention may be applied.

Whilst several embodiments have been described and illustrated it will be understood that many modifications may be made without departing from the scope of the invention. For example, the bulge 19 may be formed of separated portions each surrounding part of the circumference of the vent port 15 so as to operate within selected parts of the overall airflow incidence range. The vent port 15 may comprise a plurality of smaller diameter holes which may be arranged in concentric circles, and may be located at any desired position in the support plate 12.

Although the invention has been particularly described with reference to a rotary wing aircraft, the invention may be applied to a fixed wing aircraft, or even to any other vehicle where the problems outlined in the introduction to this specification, may arise.

I claim:

1. A static vent unit for use on a vehicle having an outer surface and a static vent line and which in operation is subjected to an airflow from any direction within a wide airflow incidence range, said static vent unit comprising:
   a generally planar mounting member for fitment generally flush to said outer surface of the vehicle, said member having both an outer and inner edge;
   a vent port through the member for connection during operation to said static vent line in the vehicle; and
   a bulge extending outwardly from the member and surrounding at least part of the vent port, the bulge having in cross section, a convex curved upper surface extending radially inwardly from said outer edge on the member to said inner edge on the member adjacent the vent port, said bulge being adapted to promote attachment of said airflow from within at least part of the airflow incidence range to said surface and direct the airflow into the vicinity of the vent port to provide a compensating increase in ambient pressure at the vent port.

2. A unit according to claim 1 further comprising an extreme positive airflow incident angle and an extreme negative airflow incident angle within said airflow incident range and a mid-range airflow incident angle and wherein the bulge further comprises curved lobe portions, and said bulge is generally semi-circular in plan and is centered parallel to said mid-range airflow incident angle with said curved lobe portions extending forwardly beyond the extremities of both said positive and said negative airflow incident angles defining the airflow incident range.

3. A unit according to claim 1 further comprising a dam portion downstream of the vent port having a forward facing surface extending generally perpendicular to the mid-range airflow angle.

4. A unit according to claim 3 wherein the forward facing surface is generally perpendicular to the upper surface of the mounting member.

5. A unit according to claim 4 wherein the forward facing surface has a sharp upper edge and ends that are blended with the upper surface of the bulge.

6. A unit according to claim 1 wherein said outer surface of said vehicle has a recess and the generally planar mounting member comprises a flat plate received in said recess.

7. A unit according to claim 1 wherein the vehicle is an aircraft.

8. A unit according to claim 7 wherein the aircraft is a rotary wing aircraft.

9. A vehicle having an outer surface, a static vent line and a static vent unit which in operation is subjected to an airflow from any direction within a wide airflow incidence range, said static vent unit comprising:
   a generally planar mounting member for fitment generally flush to said outer surface of the vehicle, said member having both an outer and inner edge;
   a vent port through the member of connection during operation to said static vent line in the vehicle; and
   a bulge extending outwardly from the member and surrounding at least part of the vent port, the bulge having in cross section, a convex curved upper surface extending radially inwardly from said outer edge on the member to said inner edge on the member adjacent the vent port, said bulge being adapted to promote attachment of said airflow from within at least part of the airflow incidence range to said surface and direct the airflow into the vicinity of the vent port to provide a compensating increase in ambient pressure at the vent port.

10. A static vent unit for use on a vehicle having an outer surface and a static vent line, and which an operation is subjected to an airflow from any direction within a wide airflow incidence range, said static vent unit comprising:
    a generally planar mounting member for fitment generally flush to said outer surface of the vehicle, said member having both an outer and an inner edge;
    a vent port through the member for connection during operation to said static vent line in the vehicle; and
    a bulge extending outwardly from the member and surrounding at least part of the vent port, the bulge having in cross-section, a convex curve upper surface that extends radially inwardly from said outer edge on the member to said inner edge on the member adjacent the vent port and has a radius of curvature that increases from said outer edge on the member to said inner edge, said bulge being adapted to promote attachment of said airflow from within at least part of the airflow incidence range to said surface and direct the airflow into the vicinity of the vent port to provide a compensating increase in ambient pressure at the vent port.

11. A vehicle having an outer surface, a static vent line and a static vent unit which in operation is subjected to an airflow from any direction within a wide airflow incidence range, said static vent comprising:
    a generally planar mounting member for fitment generally flush to said outer surface of the vehicle, said member having both an outer and inner edge;
    a vent port through the member for connection during operation to said static vent line in the vehicle; and
    a bulge extending outwardly from the member and surrounding at least part of the vent port, the bugle having in cross-section, a convex curved upper surface having a radius of curvature that increases and extends radially inwardly from said outer edge on the member to said inner edge on the member adjacent the vent port, said bulge being adapted to promote attachment of said airflow from within at least part of the airflow incidence range to said outer surface and direct the airflow into the vicinity of the vent port to provide a compensating increase in ambient pressure at the vent port.

* * * * *